Figure 1A:
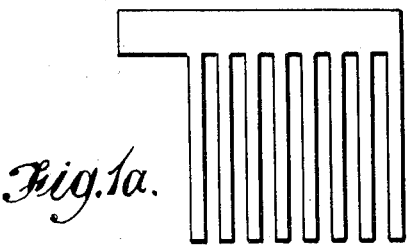

United States Patent

[11] 3,600,588

[72] Inventor Leonard Alfred Sayce
        Glasgow, Scotland
[21] Appl. No. 883,877
[22] Filed Dec. 10, 1969
[45] Patented Aug. 17, 1971
[73] Assignee National Research Development Corporation
        London, England
[32] Priority Dec. 13, 1968
[33] Great Britain
[31] 59477/68

[54] PHOTOELECTRIC OPTICAL GRATING
     5 Claims, 5 Drawing Figs.
[52] U.S. Cl. ..................................................... 250/211 R,
                                              250/237 R, 356/169 R
[51] Int. Cl. ..................................................... H01j 39/04

[50] Field of Search............................................ 250/211,
                                              237, 231; 356/169, 170

[56] References Cited
                UNITED STATES PATENTS
2,930,999  3/1960  Van Santen et al. ..........  250/211
3,214,591  10/1965  Hadley .........................  250/211
3,446,975  5/1969  Adler et al. ....................  250/211

Primary Examiner—James W. Lawrence
Assistant Examiner—D. C. Nelms
Attorney—Cushman, Darby & Cushman ABSTRACT: An index grating for use in measuring apparatus in which relative movement between the index grating and a scale grating is monitored, consisting of a regular series of alternate transparent and opaque regions, the opaque regions constituting parts of a solid state photocell. There is also described a reading head incorporating such an index grating.

PATENTED AUG 17 1971 3,600,588

PHOTOELECTRIC OPTICAL GRATING

This invention relates to optical apparatus for measuring lengths or angles of the kind comprising a "scale grating" which is movable relative to a "reading head" incorporating a source of collimated light, an "index grating" of similar spacing to the scale grating, at least one photocell arranged to receive light from the source which has been acted upon by the scale grating and the index grating so that the output of the photocell varies cyclically as the scale grating is moved relative to the reading head to give a measure of the relative movement.

It is to be understood that the term "light" includes infrared and ultraviolet radiation and that the term "grating" does not imply that diffraction effects are necessarily utilized but refers to the configuration of the structure which is similar to that of a conventional diffraction grating.

Commonly both the scale grating and the index grating are transmissive gratings, that is of the kind consisting of a succession of opaque elements separated by transparent spaces. In this case, in a typical arrangement light from a straight filament lamp is collimated by a lens and caused to be incident normally upon the scale grating. After traversing the scale grating and the index grating the light impinges upon the photocell.

It is, however, frequently desirable that the scale grating be formed upon an opaque base, such as steel, in which case the scale grating consists of a succession of specularly reflecting lines separated by diffusely reflecting (or, alternatively, nonreflecting) spaces. Since such a scale grating is opaque to light it is evident that an arrangement similar to that described above cannot be used and light reaching the photocell must first be reflected from the specular portions of the scale grating. Further, it is desirable that the light incident upon the scale grating and the light reflected should be at, or near, normal incidence; this, however, is impossible to achieve owing to the obstruction offered by existing photocells to light at normal, or near normal incidence. The present invention is intended to provide an improved index grating for use in optical measuring apparatus of the kind specified, and to improve upon the design of reading heads, particularly, but not exclusively those for use with opaque reflecting scale gratings.

According to the invention in one aspect there is provided a transmissive index grating for use in optical apparatus of the kind specified in which the opaque elements of the grating constitute parts of a solid state photocell adapted to respond to light incident upon one face of the grating but not to light incident upon the opposite face of the grating.

According to the invention in another aspect there is provided a reading head for use in apparatus of the kind specified comprising an index grating as defined in the preceding paragraph and means for causing a collimated beam of light to be incident upon said opposite face of the grating at nearly normal incidence. The index grating may comprise a transparent substrate having formed thereon a regularly spaced pattern of similar photoelectric regions each of which comprises a layer of photoelectric material sandwiched between a first electrode layer of light-transmissive material and a second electrode layer, the photoelectric material being screened from light incident on the face of the grating corresponding to the second electrode layer by a layer of opaque material, means electrically connecting together the first electrode layers of all the regions, and means electrically connecting together the second electrode layers of all the regions.

A photoelectric material is defined as a material, an electrical characteristic of which changes when the material is exposed to light either by virtue of the bulk properties of the material or by virtue of differences between the properties of different parts of the material.

Figure 1B:
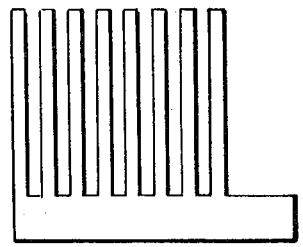
Figure 1C:
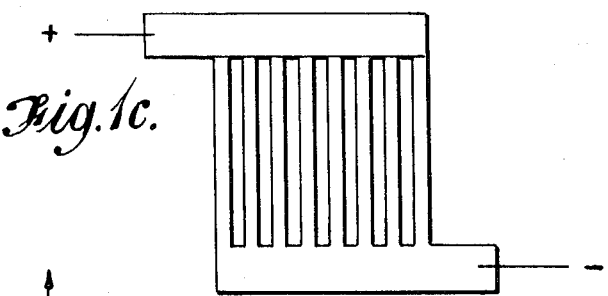
Figure 2:
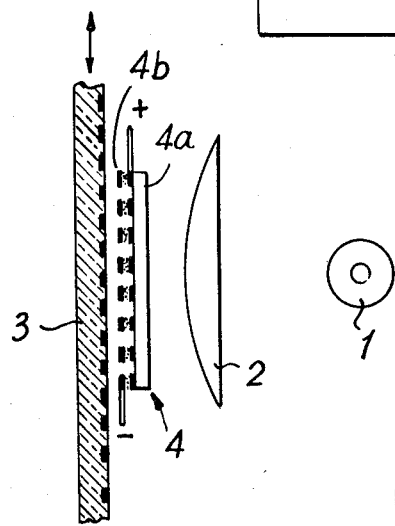
Figure 3:
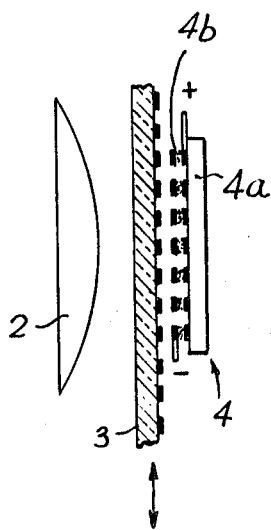

Embodiments of the invention will be described by way of example with reference to the accompanying diagrammatic drawings in which:

FIGS. 1a, 1b and 1c illustrate stages in the manufacture of an index grating embodying the invention, FIG. 2 illustrates a measuring system embodying the invention, and, FIG. 3 illustrates the second measuring system embodying the invention.

One possible method of constructing a photoelectric index grating according to the invention is as follows:

a. A suitably spaced succession of parallel bands of an opaque metallic film joined at one end to form a "bus bar" is printed upon a glass base by vacuum deposition followed by well-known photomechanical methods, as shown diagrammatically in FIG. 1a.

b. The whole area of the grid of metallic film formed in stage (a) is coated with a thin and uniform layer of photoelectric material, for instance an evaporated layer of cadmium sulfide made photovoltaic by doping the surface with cuprous ions.

c. The layer of photoelectric material is in turn covered, by vacuum evaporation, with a layer of semitransparent but electrically conducting material, such as gold or tin oxide of suitable thickness.

d. The electrically conducting layer is covered with a layer of photoresist upon which is then printed the same pattern of parallel bands as in stage (a) these bands being in exact register with those of stage (a). As in stage (a) the parallel bands are joined at one end by a "bus bar" of the same material but this bus bar is printed at the opposite end to that of stage (a), as shown in FIG. 1b.

e. After development of the exposed resist (which brings about the removal of the unexposed areas), the whole is immersed in a solvent of both the photoelectric material and the electrically conducting layer. If a suitably transparent photoresist has been used the remaining exposed resist may be allowed to remain as a permanent protection, otherwise it may be removed by a suitable solvent.

By the above sequence of operations is obtained a composite photocell in the form of a grating each line of which is opaque to light incident upon the back surface but photosensitive to light incident upon the front surface.

The electrical output of this composite photocell index grating is provided by the bus bars formed in the initial opaque film and the final electrically conducting semitransparent film respectively, as shown in FIG. 1c.

A photoelectric index grating prepared by the foregoing method, or some other method leading to a similar result may be employed in a reading head for reflecting scale gratings in a manner shown in FIG. 2 in which light from a straight filament lamp 1, is collimated by a lens 2, reaches a reflecting scale grating 3 through the clear spaces of the photoelectric index grating 4 and is reflected back to the index grating 4; the grating 4 is arranged with the glass base 4a facing the lamp 1 and the photocell 4b facing the grating 3 so as to respond to the light reflected from the grating 3. When the scale grating 3 is moved relative to the index grating 4 the light reaching the photocell 4b varies in a cyclic manner thus generating the required cyclic electrical signal.

If the axis of the collimated light beam is exactly normal to the plane of the scale grating 3, light reflected therefrom will pass back through the clear spaces of the index grating 4 through which it passed initially on its way to the reflecting grating scale 3. It is therefore necessary for the angle of incidence to depart by a small amount from the normal. The optimum departure from normal incidence varies according to the separation between the gratings and the line spacing of the index grating 4 but typical values, for a gap of 0.03 inch between the gratings are 0.5° for 1000 lines per inch and 4.8° per 100 lines per inch.

Although particularly suitable for use in reading heads for reflecting scale gratings, it is evident that a photoelectric index grating of the kind described is equally suitable for use with a transmission scale grating and such an arrangement is shown in FIG. 3 in which elements similar to those in the arrangement illustrated in FIG. 2 bear the same reference numerals. Referring to FIG. 3, light from the lamp 1 is collimated by the lens 2 as before, but is now incident upon a transmissive scale grating 3'. The light passes through the clear spaces of the scale grating 3' to reach the index grating 4, and again varies in a cyclic manner when the scale grating 3' is moved relative to the index grating 4.

To simplify the foregoing description and diagrams, reading heads employing only one index grating have been described. In general, however, more than one index grating would be formed upon a common base, so arranged that their electrical outputs are in phased relationship.

I claim:

1. For use in optical apparatus, a transmissive index grating having alternate opaque and light transmissive elements, and in which the opaque elements of the gratings constitute parts of a solid state photocell, a first side of the grating being responsive to light and the second side of the grating being nonresponsive to light.

2. An index grating according to claim 7, comprising a transparent substrate with said opaque elements formed thereon in a regularly spaced pattern wherein said opaque elements comprises a layer of photoelectric material sandwiched between a first electrode layer of light-transmissive material and a second electrode layer, the photoelectric material being screened from light incident on the face of the grating corresponding to the second electrode layer by a layer of opaque material, means electrically connecting together the first electrode layers of all the regions, and means electrically connecting together the second electrode layers of all the regions.

3. An index grating according to claim 2, in which the layer of opaque material is said second electrode layer.

4. An index grating according to claim 2, in which the photoelectric material is cadmium sulfide having a region adjacent the first electrode layer doped with cuprous ions.

5. A reading head for use in optical apparatus of the kind specified, comprising an index grating according to claim 7 and means for causing a collimated beam of light to be incident upon said second side of the grating at nearly normal incidence.